Jan. 5, 1937.  C. R. ARNOLD  2,067,006
METHOD OF RECOVERING METALS FROM ORES, ETC
Filed June 6, 1934
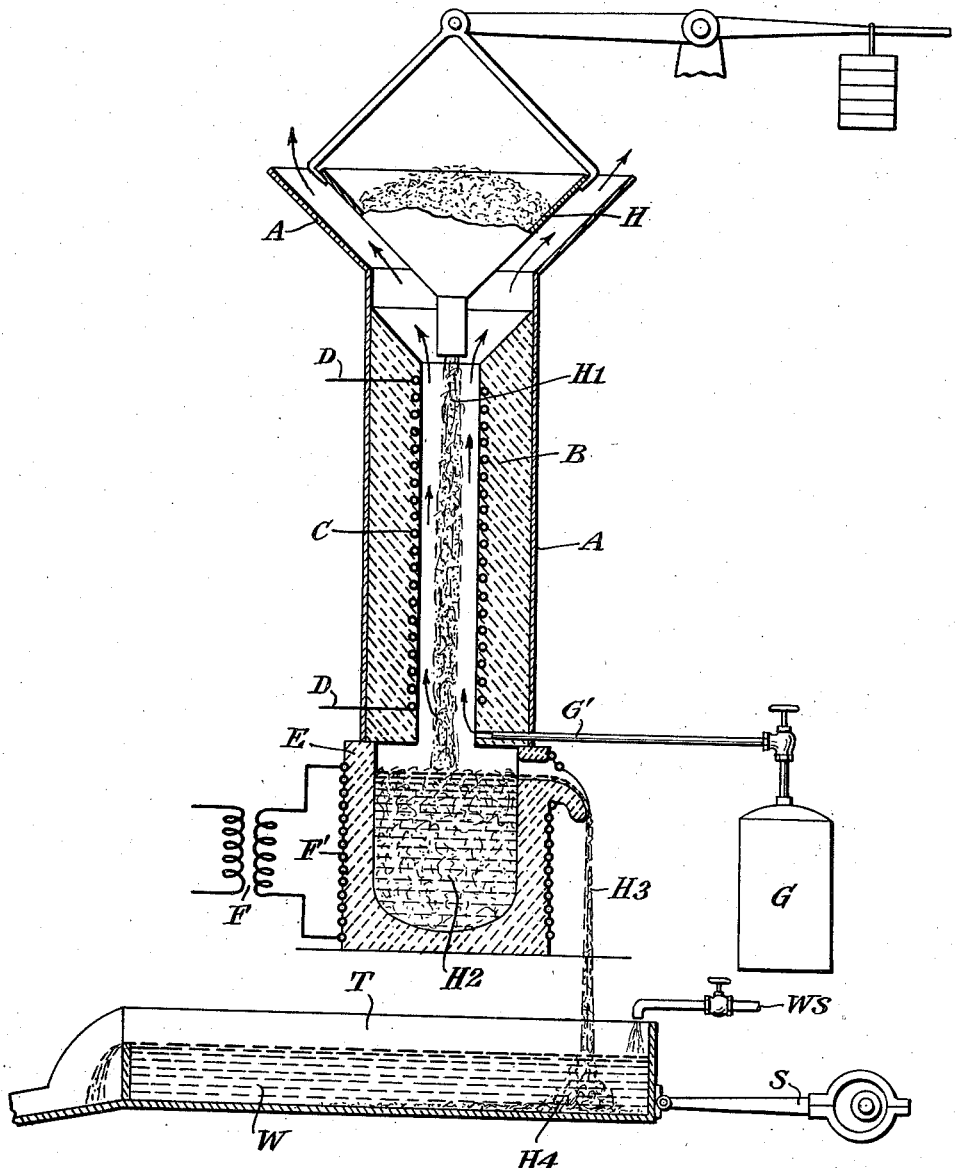
INVENTOR
Craig R. Arnold
BY
Townsend + Decker
ATTORNEYS Patented Jan. 5, 1937

2,067,006

UNITED STATES PATENT OFFICE 2,067,006

METHOD OF RECOVERING METALS FROM ORES, ETC.

Craig Ritchie Arnold, Dahlonega, Ga.

Application June 6, 1934, Serial No. 729,211

10 Claims. (Cl. 75—83)

This invention relates to a method of and apparatus for recovering metals from ores wherein the said metal consists of gold contained in quartz or associated with other metallic substances as for instance with the form of iron known as iron sulphide or for recovering metals from other materials wherein there are non-metallic constituents required to be separated out to allow the gold or other metal content to be obtained.

Generally stated the invention is applicable to any or all materials or ores which may be fused, roasted or otherwise treated by intensive heat so as to break up or assist in breaking up the combination.

The invention consists in heating the ore or other metal bearing material to high temperature sufficient to render the same fluid or semi-fluid and then plunging the heated mass into a cooling fluid for the purpose of disassociating the non-metallic content, such for instance as silicates, from the metallic portion.

Another special object of the invention is to recover the gold content of a gold ore containing ferric sulphide, silica and gold by highly heating the ore to render it fluid and then suddenly cooling the fluid material to disassociate the metal content from the non-metalic and then treating the material to dissolve out the iron constituent leaving the gold free.

The process forming my invention is not limited to use in connection with any particular ore but may be employed in connection with any or all ores or materials that can be fused by intensive heat. In carrying out the invention I may employ any form of furnace but I prefer to employ one of the simpler forms of electric induction furnace wherein a current of high frequency is applied as a primary current to the ore or other material contained in a proper crucible or receptacle of refractory material wherein the material is related to the primary current as a secondary and becomes the seat of induced currents which heat the same to high temperatures and in my improved process to such a degree as preferably to render the same fluid.

In carrying out my invention I also prefer to preheat the material by the application of an electric current applied by a heating resistance coil or conductor to a receptacle having a flue through which the material passes or circulates on its way to the heating electrical induction furnace. I also prefer to preheat the material by constructing the passageway through which material flows to the furnace for the purpose of being calcined or melted or highly heated for any purpose as a chimney or flue for the escape of the heated gases from the furnace and further to employ a hopper constructed to partially close the mouth of said chimney and to be capable of adjustment to regulate the extent to which the heated gases may escape thus regulating the heating effects in the furnace proper.

The preheating resistance furnace may be operated to preheat or prepare the ore so far as practical for fusion in the inductance furnace, the ore being preferably reduced to a finely ground state or dressed small enough to be fed through a hopper located above the the fusion furnace proper, said hopper being manually or automatically fed in any desired way to keep up a supply of ore fed to the induction furnace when the operation is carried on as a continuous operation. The particular construction of this preheating resistance furnace preferably used in a preliminary calcining, melting or other heating operation is not, however, specifically claimed in the present application but will be made the subject of a separate application.

A construction of apparatus suitable for practicing the invention herein claimed is illustrated in the accompanying drawing which is a general vertical section and partial elevation of an apparatus embodying my improved construction and of a character adapted for use in carrying out my improved process of ore reduction.

As shown in the drawing the ore to be treated is supplied from any suitable source as for instance from a hopper H to a preheater comprising as indicated an outer shell A surrounding a shell of non-fusible or refractory material of any desired character indicated at B and provided with a vertical central passageway for feeding the ore downwardly and with a heating electrical resistance wire or coil C preferably wound on a form and having the surrounding material B moulded around it to hold it in shape and in position for furnishing heat as directly as possible to the material flowing or passing through the center of the heater. This coil may be practically exposed on the inside so as to be in intimate heating relation to the material to be heated thereby. The tubular passage also acts as a flue or chimney through which the ascending gases or heat from the heated material in the crucible E of the induction furnace below the same pass. Below this resistance heater, constituting the device which I term a preheater because its object is mainly to raise the temperature of the material to a high degree or even and preferably to fusion before it is delivered to the induction furnace or other means for further heating (although this preheater can be used separately or independently of the present process for calcining ores) lies the crucible or melting pot E of said induction furnace. I prefer to use for said induction furnace the type known as the coreless type, said crucible E being located within the coil F' which is itself the seat of high frequency currents supplied from a transformer F or from other suitable source of current. The ore in the induction furnace is indicated at $H^2$ and the stream of ore passing from the hopper H is indicated at H'. The tubular preheater A preferably has a conical mouth as indicated into which the hopper H for the ore partially extends. The escaping gases from the induction furnace pass through the mouth to greater or less extent depending upon the level at which the hopper H is adjusted.

The crucible itself may be made of any suitable refractory material as well understood in the art, proper for resisting the high temperatures of the molten mass melted within the same by the inductive action of the currents circulated in the coil F around the same. I do not describe in detail the means for raising the frequency of the current in the coil F' to the desired extent as this particular part of the apparatus may take any form desired. As well known in the art the setting up of the currents in the charge of material in this crucible has a tendency to stir up the molten mass so that it may flow out through a proper channel it being understood that the material fed through the heater is fed in sufficient amount to keep the crucible filled to overflowing. The fused mass of melted material may be delivered from said crucible over the edge thereof as shown, continuously into a bath or receptacle containing a chilling substance like water where the final stage of the treatment forming my invention may take place. A receptacle or bath for water into which the material is fed is indicated at T and may be of any desired form. The body of water into which the material is fed is indicated at W and the receptacle T is preferably made as a trough which may be properly suspended and shaken by a cam or eccentric or other suitable mechanism and having the function of jarring the particles towards the depressed end to make space for fresh material fed from the furnace. A source of liquid supply, such as water is indicated at W—S and the material delivered into the bath of water from the furnace is indicated at $H^4$ which is replenished by the stream $H^3$ of material overflowing the edge of the crucible.

The water may be allowed to flow slowly through the tank T carrying with it the non-metallic material separated out and consisting for instance of the silica or other impurities intimately associated with the metallic content of the ore undergoing treatment. The sudden cooling of the melted mass in the water results in "exploding" the same and any fused siliceous or other impurities are thrown off and conveyed beyond the remaining metallic melted globules or particles or metallics comprising the iron sulphide and gold. The remaining impurities or fused slags may be passed onward by the stream of water. The globules of metallic substance freed from the siliceous or other impurities appear as particles of irregular shape or surface which is very desirable for the final step of separating the precious metal as gold from the cheaper metal as the iron content. This final operation or dissolution when the invention is applied to material containing iron sulphides may be effected as a step subsequent to the "exploding" in any suitable receptacle by the use of a sulphuric acid solvent converting the iron into a ferrous sulphate and releasing the entailed gold when the process is applied to treating primary or auriferous sulphide ores to which my process is particularly adapted. The resulting gold is found as a sludge precipitated in the bottom of the dissolution tank from which it is recovered, dried, fluxed and melted in the usual prescribed manner.

In this process of flowing the melted ores or concentrates into water to remove the waste materials adhering to the fused metallics I have nothing to contend with in the way of foreign substances and treat only iron sulphide in which one of the atoms of sulphur is exploded or driven out during the fusion and sudden cooling of the mass. This method of treating the primary or sulphide ores is advantageous because it renders it unnecessary to grind the ore to an exceedingly fine mesh as in former practice (which is costly and requires rather high grade gold ore to pay for such ore dressing), preparatory to treating with a cyanide of potassium or soda solution of proper density as a means of converting entire gold into a cyanide of gold which then is recovered by well known methods.

I find in practice that quite coarse concentrates are readily and easily fused in such a furnace as I have described and results are obtained quickly without the expense or delay of fine grinding and of dissolving the solution with cyanide solution.

In my invention I accomplish another very desirable object in that I recover the iron as ferrous sulphate which has a commercial market value and is therefore not wasted as in all other methods or processes and the entire removal of all cyanicides.

It will be noted that the hopper H may be raised or lowered to act as a stopper and thereby adjustably check the upward flow and escape of heat from the furnace. This hopper is an intermediate one and the materials to be smelted or fused are to be supplied from a stock hopper or bin which feeds the smaller one, the latter then having a dual mission which is to regulate the flow of heat by regulating the draft and to concentrate the material to be fused or calcined into a stream directed down through the center of the heater. This preheating preheats the materials such as ores ground fine enough to be fed through the furnace and raise the temperature to such a point that the reactance furnace will readily supply the final heat when necessary to fuse the mass. In this furnace the coils F and F' may be in the form of hollow wires or tubes through which water may be passed if required to keep down their temperature. The general object in causing the other materials to strike the water is to suddenly contract and in a sense explode the same. The result is that the particles of material assume a subdivided condition in which the metallic particles assume irregular or amorphous shapes and at the same time the well fused waste coverings such as silicates or slags are exploded off to leave a clean bright surface. The adhering silica or other foreign substances exploded off is carried away in the flow of water which is regulated in amount to that purpose.

At G I indicate a gas tank or generator for which any active gas chosen for any particular purpose may be introduced through the pipe G' to maintain a reducing atmosphere during the heating period and aid in the disassociation of the materials to be fused or calcined or otherwise heated treated. If the gas chosen is hydrogen and introduced into the chamber in the presence of iron it would have a great affinity for sulphur converting this element into the sulphurated form or sulphide of hydrogen. It follows as a function of the formation of this hydrogen sulphide, that it may be collected and used, for instance, by conversion into sulphuric acid by any desired method, or for other use to which it is adapted. Another gas might be employed which would tend to eliminate some of the atoms of sulphur or a gas, like oxygen, could be used to effect oxidization of the material by chemical combination therewith and at the same time raise or tend to raise the temperature.

As will be seen my improved process practically reverses the usual process of recovering gold or other precious metals in that instead of using a cyanide to unite with the gold and leave the iron as in the old process I use a sulphuric or other acid to dissolve the iron out and leave the gold or precious metals as a by-product of the bath. Hydrochloric acid might be used in place of the sulphuric acid but would have the disadvantage that it would dissolve the gold but insofar as the iron of the bath is concerned the process would be the same as if sulphuric acid is employed. Furthermore the hydrochloric acid would have the disadvantage that the iron would be converted into ferric chloride which would have no commercial value. The result of converting the iron content of the bath by the use of sulphuric acid would be the production of ferrous sulphate commercially known as copperas.

My improved apparatus may be used in a calcining process by mixing the pulp or material with a carbon (coal or charcoal) and removing the ferric and ferrous bases (red paint, oxide of iron and copperas) leaving but a small portion of the pulp as highly refined concentrate which would carry the auric contents. The carbon so added is for the purpose of aiding in the fusion or reduction of the ore and elimination of foreign elements as in metallurgical operations generally and will naturally vary according to the nature of the ore treated. Ordinarily with the ores mentioned an addition of 10% of carbon to the total mass will serve although in some cases about one sixth will be found more satisfactory. By this means a resultant mass of treated ore is produced that will readily dissolve by treatment with sulphuric acid as herein described to remove the ferric and ferrous bases.

It will be understood that materials H' are fed down until they rest in the crucible E where they remain until fused or melted and that they then start to flow off through the outlet as shown at H³ the said materials being replenished from the hopper H periodically as required or as a continuous regulated flow to give a continuous operation.

The invention claimed is:

1. The method of treating metallic sulphide ores containing iron and gold consisting in fusing the material to a temperature above that at which gold melts, then plunging it into a cooling liquid to congeal and disassociate the metallic parts of iron and gold from the non-metallic parts and treating the resultant metallic constituents to recover the iron content as a ferrous sulphate.

2. A method of treating auriferous iron pyrites to separate out the gold and recover the iron content consisting in heating the ore to high temperature above that at which gold melts sufficient to render the gold fluid and then plunging the same into a cooling element to separate out the foreign non-metallic materials and dissolving out the iron content and leaving free gold.

3. The method of smelting sulphide ores containing precious metals and including base metals of the iron group, consisting in fusing the ore to a temperature above the melting temperature of the precious metal to be recovered, suddenly cooling the same to convert the sulphide of the ore into a base readily soluble in acids, and converting them into a sulphate thereby liberating the gold content in such state or form that it can be readily recovered in well known ways.

4. The method of smelting ores containing a precious metal and metal belonging to the iron group consisting in fusing the ore to a temperature above the melting temperature above that at which the precious metal to be recovered will melt to convert the iron content of the material into an iron base readily soluble in acid, introducing the fused mass into a cooling bath and converting the iron content into a sulphate of iron and thereby liberating the gold content.

5. The method of treating a sulphide ore containing iron and free gold consisting in heating the ore to a high temperature above that at which gold will melt to reduce the same to fluid condition and then suddenly cooling the same in a bath and treating the resultant globules with a suitable acid to dissolve out the iron leaving the gold free.

6. The method of treating sulphide precious metal ores to recover the metallic content thereof consisting of pre-heating the ore in the presence of hydrogen, fusing the pre-heated mass at a temperature above the melting temperature of precious metal and then plunging the heated material into a cooling fluid to dissassociate the non-metallic portion from the metallic portions and treating the metallic residue with sulphuric acid.

7. The method of treating gold bearing sulphide ores having an iron content consisting in preheating the ore in the presence of non-oxidizing gas of the type of hydrogen having an affinity for uniting with sulphur to eliminate the sulphur for collection and conversion into sulphuric acid by any desired method, fusing the preheated mass, suddenly cooling the same to cast off the surface siliceous material, treating the resultant material with sulphuric acid to convert the iron content into copperas and recovering the gold as a by-product.

8. The method of treating auriferous iron sulphide ores to recover the iron and gold content thereof, consisting in heating the ore to fusing temperature above the melting temperature of the gold being recovered so as to produce a substantially molten mass, passing the molten mass into a cooling bath and thereby detaching the non-metallic portion of the ore and leaving the iron and gold portion thereof in small particles, and dissolving out the iron to free the gold particles or content.

9. The method of treating auriferous iron sulphide ores to recover the iron and gold content thereof, consisting in heating the ore to fusing temperature for the ore so as to produce a substantially molten mass, passing the molten mass into a cooling bath and thereby detaching the non-metallic portion of the ore and leaving the iron and gold portion thereof in small particles, dissolving out the iron content to free the gold, and treating the iron solution to recover the iron constituent of the ore.

10. The method of treating precious metal ores containing a base metal to recover a precious metal and the base metal therefrom, consisting in heating the ore to fusing temperature for the ore above the melting temperature of the precious metal to be recovered so as to produce a substantially molten mass, passing the molten mass into a cooling bath and thereby detaching the non-metallic portion of the ore and leaving the precious metal and base metal portion thereof to be recovered in small particles, treating with a suitable acid to dissolve out the base metal content and free the precious metal content, and treating the base metal solution to recover the base metal constituent of the ore.

CRAIG R. ARNOLD.